United States Patent
Ado et al.

(10) Patent No.: US 6,399,041 B1
(45) Date of Patent: Jun. 4, 2002

(54) PROCESS FOR PRODUCING LAYERED ROCK-SALT TYPE LITHIUM COBALT OXIDE BY HYDROTHERMAL OXIDATION

(75) Inventors: Kazuaki Ado; Mitsuharu Tabuchi; Hironori Kobayashi; Hiroyuki Kageyama, all of Ikeda (JP)

(73) Assignee: Agency of Industrial Science & Technology, Tokyo (JP)

( * ) Notice: Subject to any disclaimer, the term of this patent is extended or adjusted under 35 U.S.C. 154(b) by 0 days.

(21) Appl. No.: 09/231,877

(22) Filed: Jan. 14, 1999

(30) Foreign Application Priority Data

Mar. 13, 1998 (JP) ............................... 10-082575

(51) Int. Cl.[7] .......................... C01G 49/00; H01M 4/58
(52) U.S. Cl. ..................... 423/594; 429/231.3
(58) Field of Search ................ 423/594, 138, 423/179.5, 641; 429/231.3

(56) References Cited

U.S. PATENT DOCUMENTS

| | | | | |
|---|---|---|---|---|
| 3,931,391 A | * | 1/1976 | Koberstein et al. | 423/404 |
| 4,567,031 A | * | 1/1986 | Riley | 423/593 |
| 5,630,993 A | * | 5/1997 | Amatucci et al. | 423/594 |
| 5,863,512 A | * | 1/1999 | Ado et al. | 423/138 |
| 5,882,821 A | * | 3/1999 | Miyasaka | 429/224 |
| 5,885,544 A | * | 3/1999 | Yamazaki et al. | 423/594 |
| 5,891,416 A | * | 4/1999 | Yamazaki et al. | 423/594 |
| 5,922,491 A | * | 7/1999 | Ikawa et al. | 429/218 |
| 6,024,934 A | * | 2/2000 | Amine et al. | 423/592 |
| 6,054,110 A | * | 4/2000 | Yamada et al. | 423/592 |
| 6,103,213 A | * | 8/2000 | Nakamura et al. | 423/592 |

* cited by examiner

*Primary Examiner*—Steven P. Griffin
*Assistant Examiner*—Cam N. Nguyen
(74) *Attorney, Agent, or Firm*—Rader, Fishman & Grauer, PLLC

(57) ABSTRACT

A lithium cobalt oxide ($LiCoO_2$) having a layered rock-salt type structure produced at low temperatures by hydrothermally treating at least one water-soluble cobalt salt in an aqueous solution containing a water-soluble lithium salt and an alkali metal hydroxide at 105 to 300° C. in the presence of an oxidizing agent. An inexpensive salt of divalent cobalt is used as a starting material in this process. The lithium cobalt oxide thus obtained is useful as a cathode material for rechargeable lithium batteries.

5 Claims, 2 Drawing Sheets

PROCESS FOR PRODUCING LAYERED ROCK-SALT TYPE LITHIUM COBALT OXIDE BY HYDROTHERMAL OXIDATION

BACKGROUND OF THE INVENTION

This invention relates to a process for producing a lithium cobalt oxide ($LiCoO_2$) having a layered rock-salt type ($\alpha$-$NaFeO_2$ type) structure. A powder of such lithium cobalt oxide is useful, e.g., as a cathode material for rechargeable lithium-ion batteries.

Due to their extraordinary energy density, rechargeable lithium-ion batteries are presently attracting attention as rechargeable power sources for use in portable electronic/electric devices such as portable telephones and notebook-type personal computers. Investigations are being made on the utilization of this type of batteries also as a large-capacity energy resource for, e.g., electric vehicles. Thus, the lithium-ion batteries are increasing in importance more and more.

The current rechargeable lithium-ion batteries mostly employ a lithium cobalt oxide ($LiCoO_2$) having a layered rock-salt type ($\alpha$-$NaFeO_2$ type) structure as a cathode material, a carbonaceous material such as graphite as an anode material, and a solution of any of various organic substances including Li salt as an electrolyte. In particular, the demand for $LiCoO_2$ as a cathode material is expected to increase in the future. However, since this compound contains cobalt, which is a rare metal, it is one of the causes of the high costs of rechargeable lithium-ion batteries. Therefore, a means for obtaining the lithium cobalt oxide at lower cost is required.

The lithium cobalt oxide has conventionally been synthesized by firing a mixture of cobalt oxide with lithium carbonate in the air at 700 to 900° C. For an attempt to reduce the high production cost due to high-temperature firing, it is necessary to find out a method in which the reaction is conducted at a lower temperature. However, a rechargeable lithium-ion battery employing a sample synthesized, e.g., at around 400° C. as a cathode material has a discharge plateau around 3.5 V, which is lower than those of batteries employing a cathode material synthesized at 850° C. (about 3.8 to 4 V). Hence, when a cathode material synthesized at such a low temperature is used as it is in a rechargeable lithium-ion battery, this leads to reduced battery performances (E. Rossen, J. N. Reimers and J. R. Dahn, *Solid State Ionics*, 62(1993)5; J. N. Reimeres and J. R. Dahn, *J. Electrochem. Soc.*, 139(1992), 2091).

In view of the above, if a cathode material comparable in properties to a lithium cobalt oxide obtained through high-temperature firing can be produced through lower-temperature synthesis, this technique is extremely useful industrially.

Among low-temperature synthesis methods is hydrothermal synthesis. A prior art method for hydrothermal synthesis (air oxidation/hydrothermal method) is the use of CoOOH as a starting material to generate $LiCoO_2$ at 160° C. (D. Larcher, M. R. Palacin, G. C. Amatucchi and J. M. Tarascon, *J. Electrochem. Soc.*, 144(1997), 408). However, since the cobalt in CoOOH, used in this method, is trivalent, it is usually necessary to oxidize beforehand an inexpensively available starting material of divalent cobalt (cobalt(II) chloride, cobalt(II) hydroxide, etc.). Namely, the above hydrothermal synthesis method necessitates two reaction processes respectively for CoOOH production and for reacting the obtained CoOOH with lithium.

SUMMARY OF THE INVENTION

Accordingly, the main object of this invention is to provide a technique for producing at a low temperature a layered rock-salt type $LiCoO_2$, useful as a cathode material for rechargeable lithium batteries, from an inexpensive salt of divalent cobalt.

The inventor has made intensive studies in view of the above-described problems of prior art techniques. As a result, the inventor has succeeded in establishing a technique for producing a layered rock-salt type $LiCoO_2$, useful as a cathode material for rechargeable lithium-ion batteries, from a salt of divalent cobalt by a hydrothermal synthesis method (hereinafter referred to as the hydrothermal oxidation method).

Specifically, the process of this invention for producing a lithium cobalt oxide ($LiCoO_2$) having a layered rock-salt type structure by the hydrothermal oxidation method is characterized by hydrothermally treating at least one water-soluble cobalt salt in an aqueous solution containing a water-soluble lithium salt and an alkali metal hydroxide at 105 to 300° C. in the presence of an oxidizing agent.

Examples of the water-soluble cobalt source for use in this invention include chlorides, nitrates, and sulfates of cobalt and hydrates of these and hydroxides of cobalt. Preferred of these cobalt sources are compounds of divalent cobalt (chloride, nitrate, sulfate, etc.). These cobalt sources may be used alone or in combination of two or more thereof.

The oxidizing agent may be, for example, water-soluble chlorate or peroxide of an alkali metal such as sodium or potassium. Specific examples thereof include $NaClO_3$ and $KClO_3$. Two or more oxidizing agents may be used in combination.

The water-soluble lithium source may be lithium chloride, nitrate, sulfate, hydroxide, etc. Specific examples thereof include lithium hydroxide (any of anhydrous and hydrated ones) and lithium chloride. These lithium sources may be used in combination of two or more thereof.

Examples of the alkali metal source include sodium hydroxide and potassium hydroxide (any of anhydrous and hydrated ones). These may be used in combination.

A general procedure of the process of this invention is described below. A water-soluble cobalt salt is dissolved in distilled water in an amount of usually about 0.01 to 1 mol/l (hereinafter abbreviated as M), preferably about 0.1 to 0.5 M, in terms of anhydride. A small amount (about 1 to 10 cc) of concentrated hydrochloric acid is added to the aqueous solution obtained. Thereto is added about 0.1 to 100 g (preferably about 0.2 to 5 g) of an oxidizing agent. Subsequently, about 1 to 100 g (preferably about 1.5 to 50 g) of a lithium compound is added to the mixture obtained. A solution of an alkali metal source compound such as sodium hydroxide or potassium hydroxide is further added in a concentration of about 1 to 100 M, preferably about 20 to 50 M to completely dissolve the oxidizing agent.

Subsequently, the mixture thus prepared is placed still in a hydrothermal reactor (e.g., autoclave) and subjected to a hydrothermal reaction. Although the hydrothermal reaction conditions are not particularly limited, the reaction is conducted usually at about 105 to 300° C. for about 0.5 to 48 hours, preferably at about 200 to 250° C. for about 1 to 24 hours.

After completion of the reaction, the reaction product is washed with distilled water and filtered in order to remove the starting materials remaining unreacted. The reaction product is then dried to obtain the desired layered rock-salt type $LiCoO_2$. The above description should not be construed as limiting the scope of this invention, and the reaction can be conducted by other methods unless the essence of this invention is changed.

According to this invention, it has become possible to easily mass-produce a lathered rock-salt type $LiCoO_2$, which has been difficult to industrially produce at low cost. Consequently, the development of rechargeable lithium-ion batteries containing $LiCoO_2$ as the cathode material and the practical use thereof are more accelerated.

The X-ray diffraction patterns for the $LiCoO_2$ products obtained in Example.

Figure 2A:
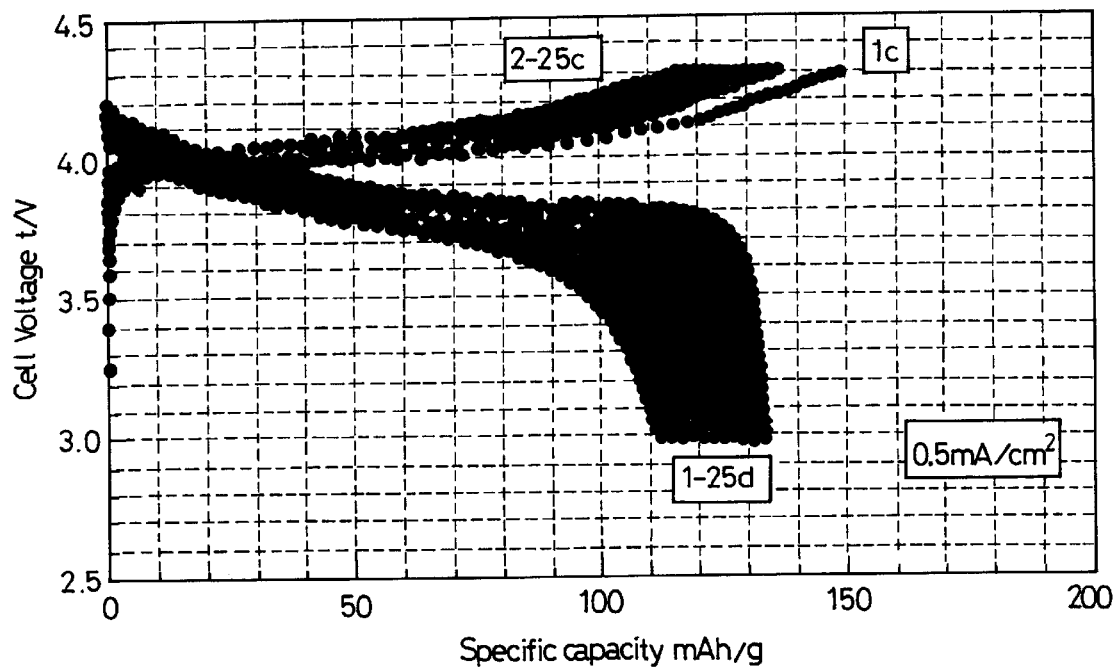
Figure 2B:
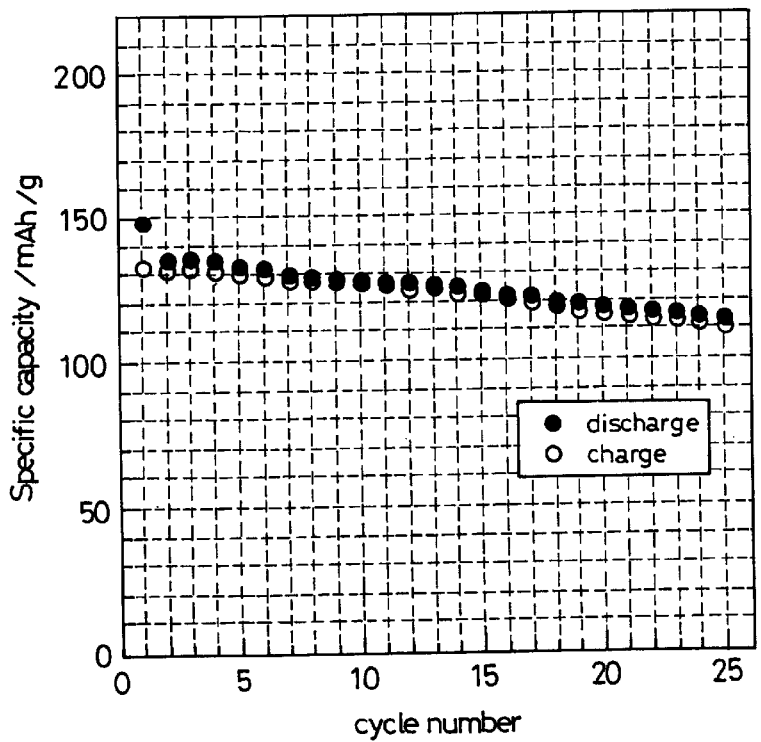

FIGS. 2(a) and 2(b)

Graphs showing the charge/discharge characteristics of a rechargeable lithium battery containing $LiCoO_2$ obtained in Example as the cathode and lithium metal as the anode.

DETAILED DESCRIPTION OF THE PREFERRED EMBODIMENTS

The features of this invention will be more clearly understood by reference to the following Example. The crystalline phase of each sample obtained in the Example was evaluated by X-ray diffractometry, and the composition thereof was evaluated by inductively coupled plasma (ICP) spectroscopy and by atomic absorption spectroscopy.

A beaker made from polytetrafluoroethylene was charged with 5.94 g of cobalt(II) chloride hexahydrate and 50 ml of distilled water. The mixture was sufficiently stirred to completely dissolve the salt. Subsequently, 5 ml of concentrated hydrochloric acid and 2 g of $NaClO_3$ as an oxidizing agent were added, and 12 g of lithium hydroxide monohydrate and 84 g of sodium hydroxide were further added together with 50 ml of distilled water. This mixture was sufficiently stirred.

Figure 1:
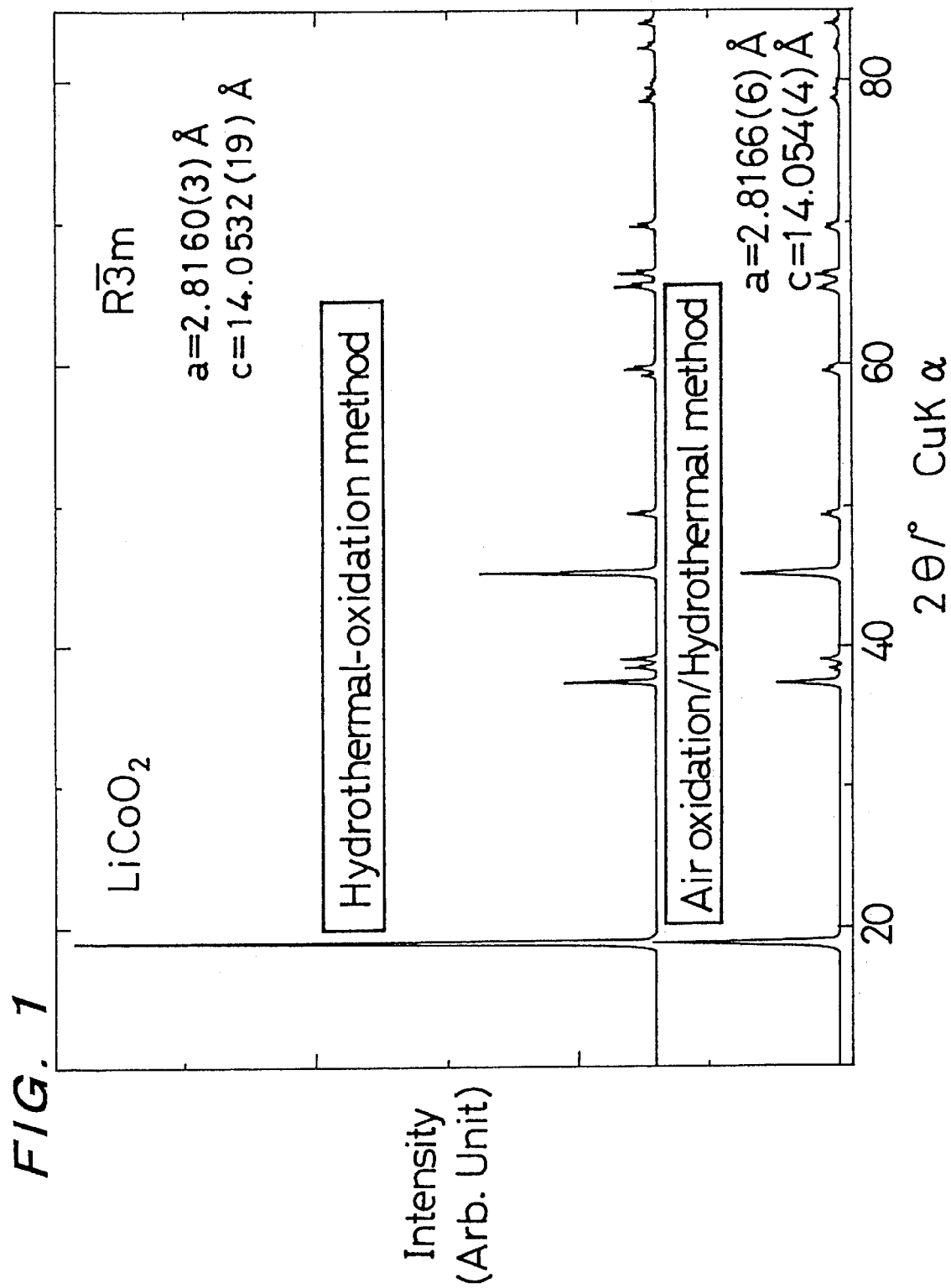
FIG. 1

The beaker containing the mixture thus obtained was placed still in a hydrothermal reactor (autoclave) to hydrothermally treat the mixture at 220° C. for 2 hours. After completion of the hydrothermal treatment, the reactor was cooled to around room temperature and the beaker was then taken out of the autoclave. The resultant precipitate was washed with distilled water to remove the excess oxidizing agent, lithium hydroxide, sodium hydroxide, and other salts. The precipitate was then recovered by filtration and dried. Thus, a powdery reaction product was obtained. The X-ray diffraction pattern of this final product is shown in FIG. 1.

For the purpose of comparison, CoOOH obtained from a salt of divalent cobalt through air oxidation was used as a starting material to obtain $LiCoO_2$ by a method in which the starting material was hydrothermally treated in an aqueous solution of excess lithium hydroxide under the same conditions as those according to this invention (hereinafter referred to as air oxidation/hydrothermal method). The X-ray diffraction pattern of this $LiCoO_2$ is shown also in FIG. 1.

All peaks were successfully indicated with indices with respect to unit cells of the hexagonal layered rock-salt type $LiCoO_2$ described in the aforementioned reference document. The results given in FIG. 1 clearly show that the peaks for the $LiCoO_2$ obtained by this invention were sharper and higher in intensity than those of the $LiCoO_2$ obtained by the air oxidation/hydrothermal method. Namely, the results indicate that high-crystallinity $LiCoO_2$ can be produced by the process of this invention. The notation R3̄m in FIG. 1 represents the space group of $LiCoO_2$ unit cells.

The results of chemical analysis given in Table 1 show that $LiCoO_2$ having an almost definite composition had been yielded in the sample obtained according to this invention.

TABLE 1

| Synthesis method | Li (wt %) | Co (wt %) | Na (wt %) | Li/Co |
|---|---|---|---|---|
| Hydrothermal oxidation method | 7.07(3) | 58.7(6) | <0.01 | 1.02(1) |
| Air oxidation/ hydrothermal method | 6.98(5) | 58.5(2) | <0.01 | 1.01(1) |
| $LiCoO_2$ | 7.09 | 60.2 | — | 1.00 |

In the table, 7.07(3), for example, means 7.07±0.03.

A rechargeable lithium-ion battery was fabricated by using the sample obtained by this invention as a cathode, lithium metal as an anode, and a 1 M solution of lithium perchlorate in a mixed solvent consisting of ethylene carbonate and dimethyl carbonate as an electrolyte solution. This battery was examined for charge/discharge characteristics (3.0~4.3 V; current density: 0.5 mA/cm$^2$). The obtained results are shown as graphs in FIGS. 2(a) and (b).

FIG. 2(a) illustrates the charge/discharge characteristics of the battery (wherein the curves ascending from left to right show charge characteristics, while the curves descending from left to right show discharge characteristics). More specifically, the curve 1c represents the charge curve for the first charge-discharge cycle and the group of curves 2–25c represents the charge curves for the second to the 25th cycles, respectively, while the group of curves 1–25d represents the discharge curves for the first to the 25th cycles, respectively.

FIG. 2(b) illustrates the dependence of the charge/discharge capacity of the battery on the number of charge-discharge cycles.

The results given in FIGS. 2(a) and (b) clearly show that even after 25 cycles, the battery had a charge/discharge capacity of about 110 mAh/g with a plateau potential of 3.7 V or higher.

Such battery characteristics are equivalent to those of rechargeable lithium-ion batteries each containing a lithium cobalt oxide obtained by solid-phase reaction at room temperature as the cathode.

It has been ascertained from the above results that the $LiCoO_2$ obtained by the process of this invention is useful as a cathode material for high-capacity lithium batteries.

What is claimed is:

1. A process for producing a lithium cobalt oxide ($LiCoO_2$) having layered rock-salt structure, which comprises hydromthermally treating in a hydromthermal reactor at least one water-soluble divalent cobalt salt in an aqueous solution containing at least one water-soluble lithium salt and at least one alkali metal hydroxide at a temperature of 105 to 300° C. in the presence of an oxidizing agent.

2. The process as set forth in claim 1, wherein the water-soluble divalent cobalt salt is selected among its chlorides, nitrates, sulfates, and hydroxides.

3. The process as set forth in claim 1, wherein the water-soluble lithium salt is selected among its chloride, nitrate, sulfate, and hydroxide.

4. The process as set forth in claim 1, wherein the oxidizing agent is selected among water-soluble chlorates and peroxides.

5. A process a set forth in claim 1, wherein said hydrothermal reactor is an autoclave.

* * * * *